US007312963B1

(12) United States Patent
Radosavljevic et al.

(10) Patent No.: US 7,312,963 B1
(45) Date of Patent: Dec. 25, 2007

(54) PROTECTIVE DEVICE WITH TAMPER RESISTANT SHUTTERS

(75) Inventors: Dejan Radosavljevic, LaFayette, NY (US); Richard Weeks, Little York, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 416 days.

(21) Appl. No.: 10/729,685

(22) Filed: Dec. 5, 2003

(51) Int. Cl.
*H02H 3/16* (2006.01)
*H01H 73/00* (2006.01)

(52) U.S. Cl. ........................................ 361/42; 361/115

(58) Field of Classification Search .................. 361/42, 361/115; 174/53, 58, 56; 439/137
See application file for complete search history.

(56) References Cited

U.S. PATENT DOCUMENTS 3,845,234 A * 10/1974 Brenner ....................... 174/67
3,990,758 A * 11/1976 Petterson .................... 439/138
4,484,021 A 11/1984 Schaefer et al.
4,544,219 A 10/1985 Barkas
4,567,544 A 1/1986 Ronemus et al.
4,722,693 A * 2/1988 Rose .......................... 439/137
4,749,360 A 6/1988 Dudley et al.
4,822,290 A * 4/1989 Cauley et al. .............. 439/137
4,867,693 A * 9/1989 Gizienski et al. ........... 439/137
4,867,694 A * 9/1989 Short ......................... 439/137
5,006,075 A * 4/1991 Bowden, Jr. ................ 439/137
5,020,997 A 6/1991 Calderara et al.
5,053,591 A 10/1991 Theurer
5,281,156 A 1/1994 Yi
5,711,066 A 1/1998 Castaldo
5,712,450 A 1/1998 Chan et al.
5,863,221 A 1/1999 Castaldo
5,932,939 A 8/1999 Simmons
5,981,875 A 11/1999 Kesler et al.
6,494,728 B1 12/2002 Germain et al.
6,522,510 B1 * 2/2003 Finlay et al. ................ 361/42
6,570,091 B1 5/2003 Kesler et al.
6,587,319 B1 * 7/2003 Finlay, Sr. ................... 361/42
6,590,753 B1 * 7/2003 Finlay ......................... 361/42
6,592,393 B1 7/2003 Gentle
6,624,990 B1 9/2003 Lortscher (Continued)

*Primary Examiner*—Michael Sherry
*Assistant Examiner*—Boris Benenson
(74) *Attorney, Agent, or Firm*—Daniel P. Malley; Bond, Schoeneck & King PLLC

(57) ABSTRACT

The present invention is directed to a protection device that includes line terminals coupled to a power source disposed in an electric power distribution system. The protection device is configured to protect a portion of the power distribution system from at least one fault condition. The device includes a receptacle member that has includes a housing and a cover. The cover includes receptacle openings configured to accommodate plug contact blades. Receptacle contacts are disposed in the housing. The receptacle contacts are also coupled to the line terminals to thereby establish an electrical connection between the receptacle contacts and the line terminals. Each receptacle contact is in communication with a corresponding receptacle opening. A protective shutter mechanism is integrated into the housing. The protective shutter mechanism is movable from a closed position to an open position upon insertion of the plug contact blades. The protective shutter mechanism is substantially hermetically sealed in the closed position. The protective shutter mechanism is also not movable from the closed position to the open position upon insertion of an object into only one receptacle opening, such that the object is prevented from making contact with the corresponding receptacle contact.

44 Claims, 8 Drawing Sheets

U.S. PATENT DOCUMENTS

| | | | |
|---|---|---|---|
| 6,734,769 B1 | 5/2004 | Germain et al. | |
| 6,873,231 B2 | 3/2005 | Germain et al. | |
| 6,949,994 B2 | 9/2005 | Germain et al. | |
| 6,963,260 B2 | 11/2005 | Germain et al. | |
| 6,969,801 B2 * | 11/2005 | Radosavljevic et al. | 174/53 |
| 7,026,895 B2 | 4/2006 | Germain et al. | |
| 2004/0212466 A1 | 10/2004 | Germain et al. | |
| 2005/0162789 A1 | 7/2005 | Germain et al. | |
| 2006/0022777 A1 | 2/2006 | Germain et al. | |
| 2006/0055490 A1 | 3/2006 | Germain et al. | |

* cited by examiner

PROTECTIVE DEVICE WITH TAMPER RESISTANT SHUTTERS

BACKGROUND OF THE INVENTION

1. Field of the Invention

The present invention relates generally to electrical protection devices, and particularly to electrical protection devices with safety features.

2. Technical Background

Ground fault circuit interrupters (GFCIs), and arc fault circuit interrupters (AFCIs) are examples of protective devices in electric circuits. These devices may be disposed in a receptacle that is subsequently installed in a wall box. The receptacle has line terminals for connection to the power line, and load terminals for connection to a load. The load terminals include receptacle contacts and feed-thru terminals. The receptacle contacts are configured to accommodate the blades of a plug connector, which are inserted to provide power to a load. Feed-thru terminals, on the other hand, are configured to accommodate wires which are connected to one or more additional receptacles, known as a downstream receptacles. The downstream receptacle may include a string of downstream receptacles that comprise a branch circuit of an electrical distribution system. Each of the aforementioned protective devices have interrupting contacts for breaking the connection between the line terminals and load terminals when the protective device detects a fault condition. The connection is broken to interrupt the load current and thereby remove the fault condition. Fault conditions include those that result in risk electrocution of personnel, or fire.

There are several safety issues that heretofore have not been addressed in an integrated way. The first type of problem are fault conditions such as ground faults and arc faults that may result in electrocution or fire, respectively. The second type of problem involves the inadvertent insertion of objects, such as paper clips and screwdriver blades into the receptacle contact openings. This situation also involves an electric shock hazard. A third type of problem relates to the introduction of contaminants into the device during shipping, handling, or storage, or following installation. Contaminants such as water, corrosive compounds, particulate matter, insects, and etc. may enter the device via the receptacle contact openings. Any of these contaminants may result in the failure of the protective device.

With respect to the first problem, historical problems with these devices include the possibility of the line wires being connected to the load terminals during installation, also known as miswiring. A variety of methods have been used to prevent, or attempt to prevent, mis-wiring, with varying levels of success. Labels and installation instruction sheets have been used to prevent mis-wiring, but can be ignored by the installer. Historical problems include a defective solenoid driving device. Solenoid burn-out has been revealed by testing the protective with a test button, but the result of the test can be ignored by the user.

In one approach that has been considered, the receptacle contacts and feed-thru terminals may remain electrically connected irrespective of whether the interrupting contacts are open or closed. Should the power line be improperly connected to the feed-thru terminals, e.g., mis-wired, the receptacle contacts remain energized even if one of the predetermined fault conditions is present in the load that is connected to the receptacle contacts via the plug connector. One drawback to this approach is that a mis-wire condition results in the receptacle contacts being accessible while the fault condition persists.

In another approach that has been considered, the lack of protection to the receptacle terminals when the protective device is mis-wired has only been partially addressed. This approach employs a circuit that prevents interrupting contacts from remaining closed when the protective device has been mis-wired. Since the interrupting contacts do not remain closed, there is lack of power to the down-stream receptacles which are connected to the line terminals. Typically, the open or closed condition of the interrupting contacts are visually indicated to the user by the position of a button, indicator lamp, or audible alarm. When the visual indicator signals that the interrupting contacts are in an open condition, or there is loss of power on the downstream receptacles, the installer is thereby prompted to correct the mis-wired condition. This approach also has its drawbacks. If the branch circuit does not include downstream receptacles, in which case the feed-thru terminals are not used, the installer is not alerted to the mis-wire condition by denial of power to either the downstream branch circuit or to the receptacle contacts. Lack of protection of the receptacle contacts is only evident to the installer if the signal or absence of signal from the visual indicator is understood. Visual indication is much more easily ignored than power denial and the mis-wire condition may not be corrected.

There have been proposed solutions for the second problem. In one approach that has been considered, an electrical receptacle includes shuttered openings to prevent the insertion of foreign objects into the receptacle contact openings. The shutter is disposed within the receptacle housing. The shutter is configured to open only when the blades of an electrical plug are inserted into the openings. One drawback to this approach, is that the shutter is a stand-alone mechanism that is not integrated with any mis-wire protection feature. Another drawback is that this approach does not take into account the third problem, e.g., the shutter does not prevent the introduction of water, corrosive compounds, particulate matter, insects, and other contaminants into the device via the receptacle contact openings. Another drawback is that the shutter is not disposed within the receptacle housing and is subject to being easily removed by the user.

What is needed is means for detecting a mis-wire condition that may be employed in conjunction with a physical barrier that prevents insertion of a plug into the receptacle until such time as power has been properly connected to the line terminals of the protection device. What is further needed is a physical barrier that is effective in preventing the second type of hazard from occurring after the device has been properly wired. Finally, the physical barrier must prevent the introduction of water, corrosive compounds, particulate matter, insects, and other contaminants into the device via the receptacle contact openings.

SUMMARY OF THE INVENTION

The present invention addresses the needs described above. The present invention provides an integrated protective device that includes mis-wire condition detector that operates in conjunction with a protective shutter. The shutter prevents insertion of a plug into the receptacle until such time as power has been properly connected to the line terminals of the protection device. The shutter is also operative after the protective device has been properly wired. The shutter is configured to open only when the blades of an electrical plug are inserted into the openings.

Finally, the shutter provides a physical seal that is operative to exclude contaminants from entering the device via the receptacle contact openings.

One aspect of the present invention is directed to a protection device that includes line terminals coupled to a power source disposed in an electric power distribution system. The protection device is configured to protect a portion of the power distribution system from at least one fault condition. The device includes a receptacle member that includes a housing and a cover. The cover includes receptacle openings configured to accommodate plug contact blades. Receptacle contacts are disposed in the housing. The receptacle contacts are also coupled to the line terminals to thereby establish an electrical connection between the receptacle contacts and the line terminals. Each receptacle contact is in communication with a corresponding receptacle opening. A protective shutter mechanism is integrated into the housing. The protective shutter mechanism is movable from a closed position to an open position upon insertion of the plug contact blades. The protective shutter mechanism is substantially hermetically sealed in the closed position. The protective shutter mechanism is also not movable from the closed position to the open position upon insertion of an object into only one receptacle opening, such that the object is prevented from making contact with the corresponding receptacle contact.

In another aspect, the present invention is directed to a protection device that includes line terminals coupled to a power source disposed in an electric power distribution system. The protection device is configured to protect a portion of the power distribution system from at least one fault condition. The device includes a receptacle member that includes a housing and a cover. The cover includes receptacle openings configured to accommodate plug contact blades. Receptacle contacts are disposed in the housing. The receptacle contacts are also coupled to the line terminals to thereby establish an electrical connection between the receptacle contacts and the line terminals. Each receptacle contact is in communication with a corresponding receptacle opening. A protective shutter mechanism is integrated into the housing. The protective shutter mechanism is movable from a closed position to an open position upon insertion of the plug contact blades. The protective shutter mechanism is substantially hermetically sealed in the closed position. The protective shutter mechanism is also not movable from the closed position to the open position upon insertion of an object into only one receptacle opening, such that the object is prevented from making contact with the corresponding receptacle contact. A mis-wiring sensor is coupled to the line terminals and the protective shutter mechanism. The mis-wiring sensor is configured to sense the proper wiring condition and actuate the protective shutter mechanism from a locked state to the unlocked state in response to detecting the proper wiring condition.

In another aspect, the present invention is directed to a protection device for use in an electric power distribution system. The protection device is configured to protect a portion of the power distribution system from at least one fault condition. The device includes a receptacle housing that includes receptacle openings configured to accommodate plug contact blades. Receptacle contacts are disposed in the housing, each receptacle contact being in communication with a corresponding receptacle opening. A protective membrane is disposed in the housing and includes a sealable hole for each receptacle opening. Each sealable hole is movable from a closed position to an open position upon insertion of a plug blade into the corresponding receptacle opening. The sealable hole is substantially sealed in the closed position.

In another aspect, the present invention is directed to a protection device for use in an electric power distribution system. The protection device is configured to protect at least a portion of the power distribution system from at least one fault condition. The device includes a housing assembly that includes at least one aperture. A protective membrane is integrated into the housing assembly and includes at least one sealable hole. A fault detection circuit is disposed on a circuit board. The fault detection circuit is configured to detect at least one fault condition and provide a fault detect signal in response thereto. Interrupting contacts are coupled to the fault detection circuit. The interrupting contacts are configured to disconnect the at least one receptacle from the electric power distribution system in response to receiving the fault detect signal. A manually operable assembly corresponds with the at least one aperture. The assembly includes an arm that passes through the sealable hole. The sealable hole and the arm is substantially sealed by the protective membrane.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
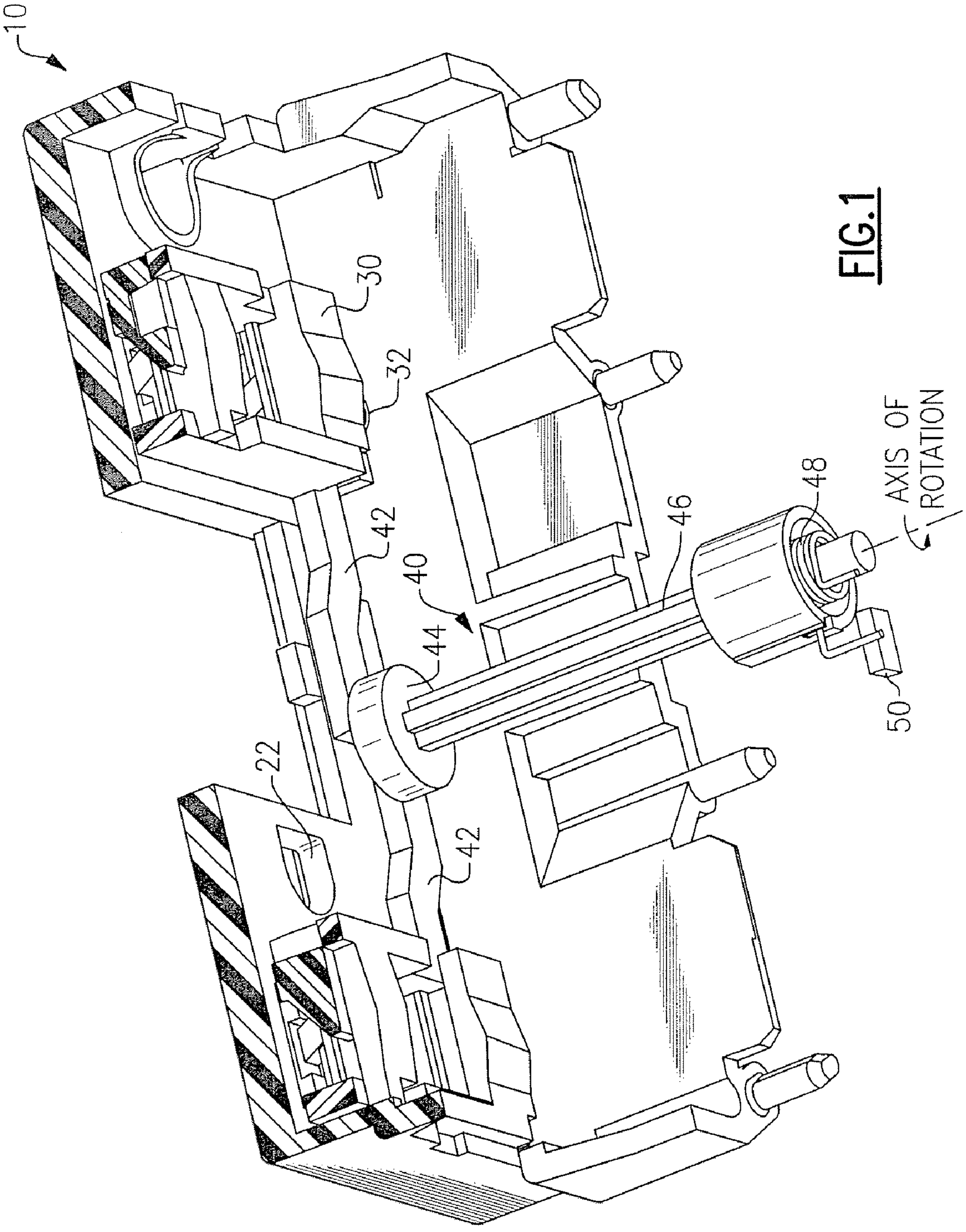
FIG. 1 is a perspective view of the shuttered receptacle in accordance with the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the shuttered protective device of the present invention is shown in FIG. 1, and is designated generally throughout by reference numeral 10.

In accordance with the invention, the present invention is directed to a protection device that includes line terminals coupled to a power source disposed in an electric power distribution system. The protection device is configured to protect a portion of the power distribution system from at least one fault condition. The device includes a receptacle member that includes a housing and a cover. The cover includes receptacle openings configured to accommodate plug contact blades. Receptacle contacts are disposed in the housing. The receptacle contacts are also coupled to the line terminals to thereby establish an electrical connection between the receptacle contacts and the line terminals. Each receptacle contact is in communication with a corresponding receptacle opening. A protective shutter mechanism is integrated into the housing. The protective shutter mechanism is movable from a closed position to an open position upon insertion of the plug contact blades. The protective shutter mechanism is substantially hermetically sealed in the closed position. The protective shutter mechanism is also not movable from the closed position to the open position upon insertion of an object into only one receptacle opening, such that the object is prevented from making contact with the corresponding receptacle contact.

Thus, the present invention provides a protective mechanism whereby electrocution by inserting a single blade into a receptacle opening is prevented. The protective mechanism is sealed in the closed position such that water, corrosive compounds, particulate matter, insects, and other contaminants are not introduced into the device via the receptacle openings. The present invention also provides a means for detecting a mis-wire condition that may be employed in conjunction with the protective shutter mechanism to thereby prevent the insertion of a plug into the receptacle until such time as power has been properly connected to the line terminals of the protection device.

As embodied herein, and depicted in FIG. 1, a perspective view of the protection device 10 in accordance with the present invention is disclosed. Device 10 includes linkage assembly 40 disposed within receptacle 20. Receptacle 20 is of a type commonly employed in the art. As such, the receptacle contacts, the feed through terminals, and the line terminals are not shown for clarity of illustration. Referring back to FIG. 1, linkage assembly 40 is mechanically coupled to protective shutter mechanism 30. Thus, protective shutter mechanism is integrated within the housing (not shown). Before device 10 is wired correctly, each protective shutter 30 is disposed in a locked position, such that plug blades or other objects cannot make contact with the receptacle contacts. Mis-wiring sensor 50 is coupled both to the line terminals and linkage assembly 40. Mis-wiring sensor 50 senses when device 10 has been properly wired. When the device has been properly wired, sensor 50 actuates linkage assembly 40 causing the protective shutter mechanism 30 to move from the locked position to the unlocked position. In the unlocked position, the plug blades are permitted to make contact with the receptacle contacts upon insertion of the plug blades into the receptacle openings. However, as will be explained in detail below, shutter mechanism 30 prevents objects that are inserted into individual openings 22 from making contact with the receptacle contacts.

Figure 2:
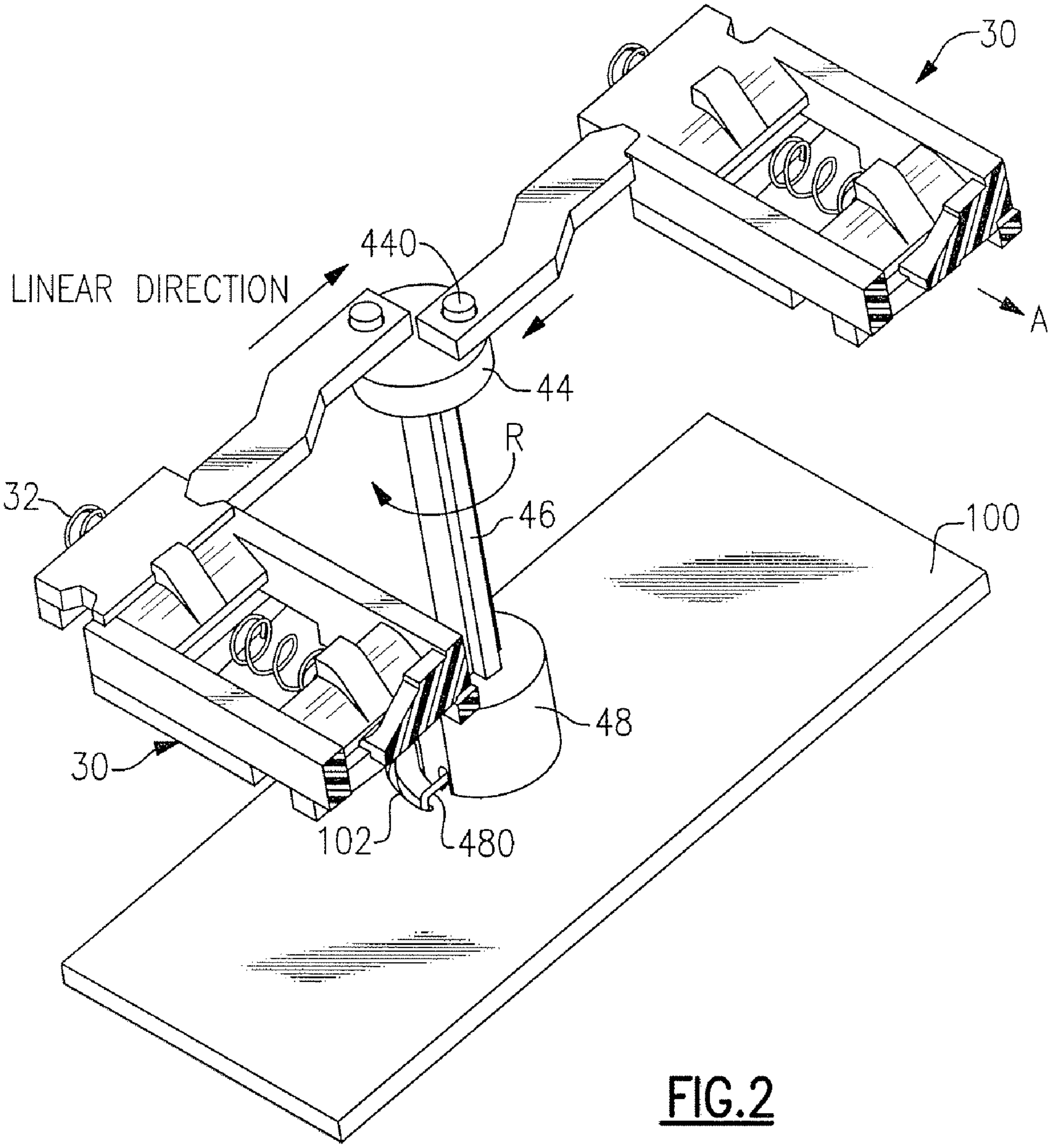
FIG. 2 is a detailed view of the linkage assembly shown in FIG. 1.

Referring to FIG. 2, a detailed view of the linkage assembly 40 shown in FIG. 1 is disclosed. Linkage assembly 40 includes two pivot arms 42, each of which are removably coupled to a protective shutter 30 in the closed position. Cam member 44 is coupled to pivot arms 42, by way of pivots 440. The cam member is configured to rotate around an axis of rotation to thereby move the pivot arms 42 in the linear direction as shown. Rotor 46 is coupled to cam 44 at one end, and is also coupled to circuit board 100 at an opposite end. A torsion spring assembly 48 is coupled to rotor 46. Spring assembly 48 includes torsion spring 480 which is coupled to mis-wiring sensor 50, which is disposed on the other side of board 100, and is therefore, not shown in this view. In the closed position, torsion spring 480 is in tension, and stores mechanical energy. When sensor 50 sensor senses the proper wiring condition, it releases spring 480, allowing it to move within slot 102. The stored mechanical energy is released, causing rotor 48 to rotate cam 46 about the axis of rotation. In response, each pivot arm 42 is moved in a linear direction as shown.

In the locked position, spring 32 is disposed between the interior of receptacle body 20 and an edge of protective shutter 30. In this position, spring 32 is in tension. When pivot arms 42 are moved, each pivot arm 42 detaches from shutter 30. The energy stored in spring 32 is released and each spring member 32 pushes protective shutter 30 into the unlocked position. After shutter mechanism 30 is moved in direction "A," as shown, mechanism 30 is closely aligned with receptacle contacts 22.

Figure 3:
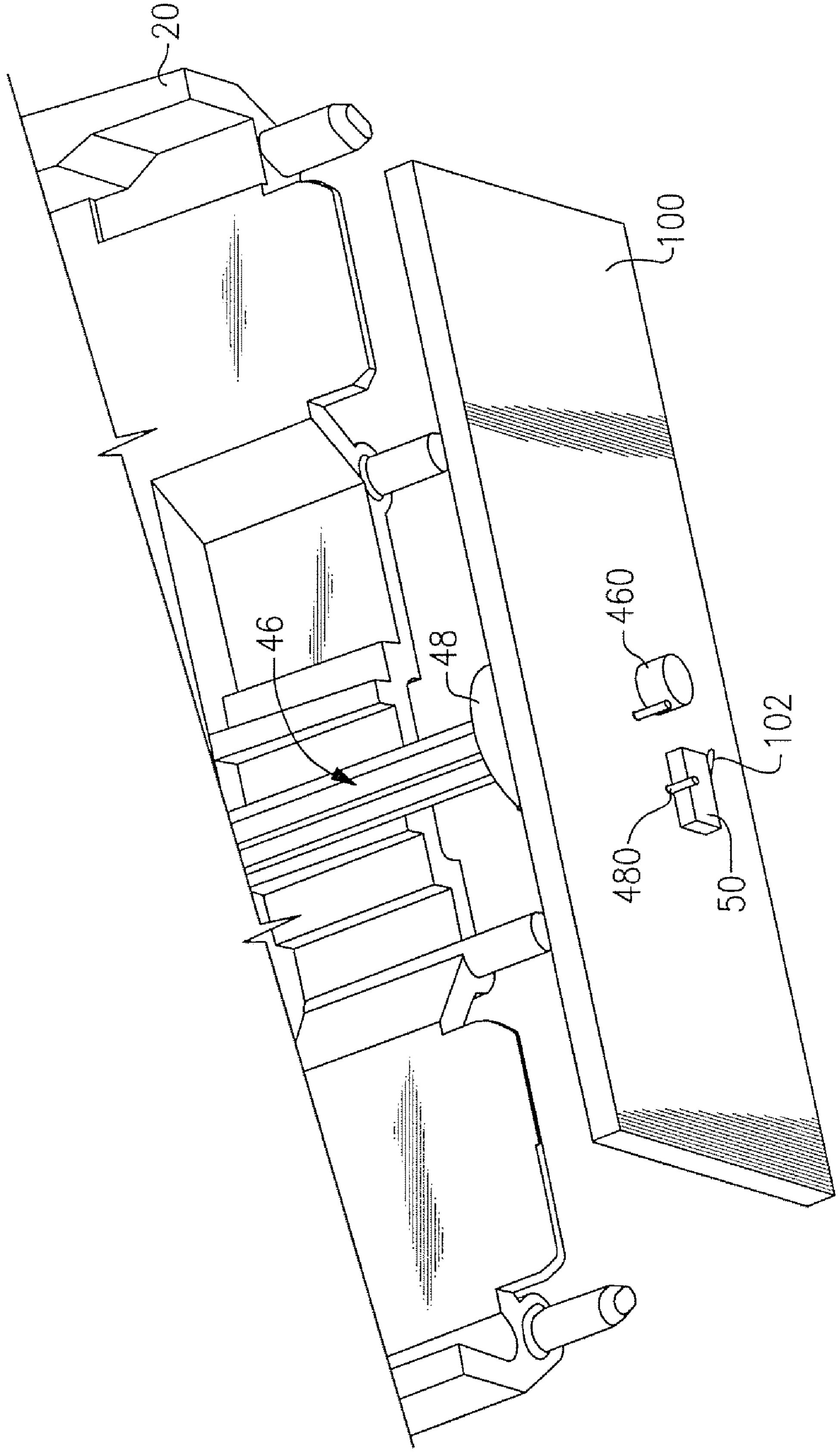
FIG. 3 is a detail view showing the interconnection of linkage assembly 40 and circuit board 100.

Referring to FIG. 3, a detail view showing the interconnection of linkage assembly 40 and circuit board 100 is shown. Rotor 46 includes a cylindrical portion 460 which is configured to be inserted into a round hole disposed in circuit board 100. Mis-wire sensor 50 is soldered to the underside of circuit board 100. In this embodiment, sensor 50 is implemented as a resistor. When device 10 is properly wired, current begins to flow through resistor 50 causing the resistor to over-heat. In one embodiment, the solder that connects resistor 50 to the board gives way, and spring portion 480 is allowed to move within slot 102. In another embodiment, the resistor 50 burns away, and spring 480 is allowed to move within slot 102. When this happens, the circuit that incorporates resistor 50 is open. This will be explained in more detail in the discussion pertaining to FIG. 8 and FIG. 9.

Figure 4:
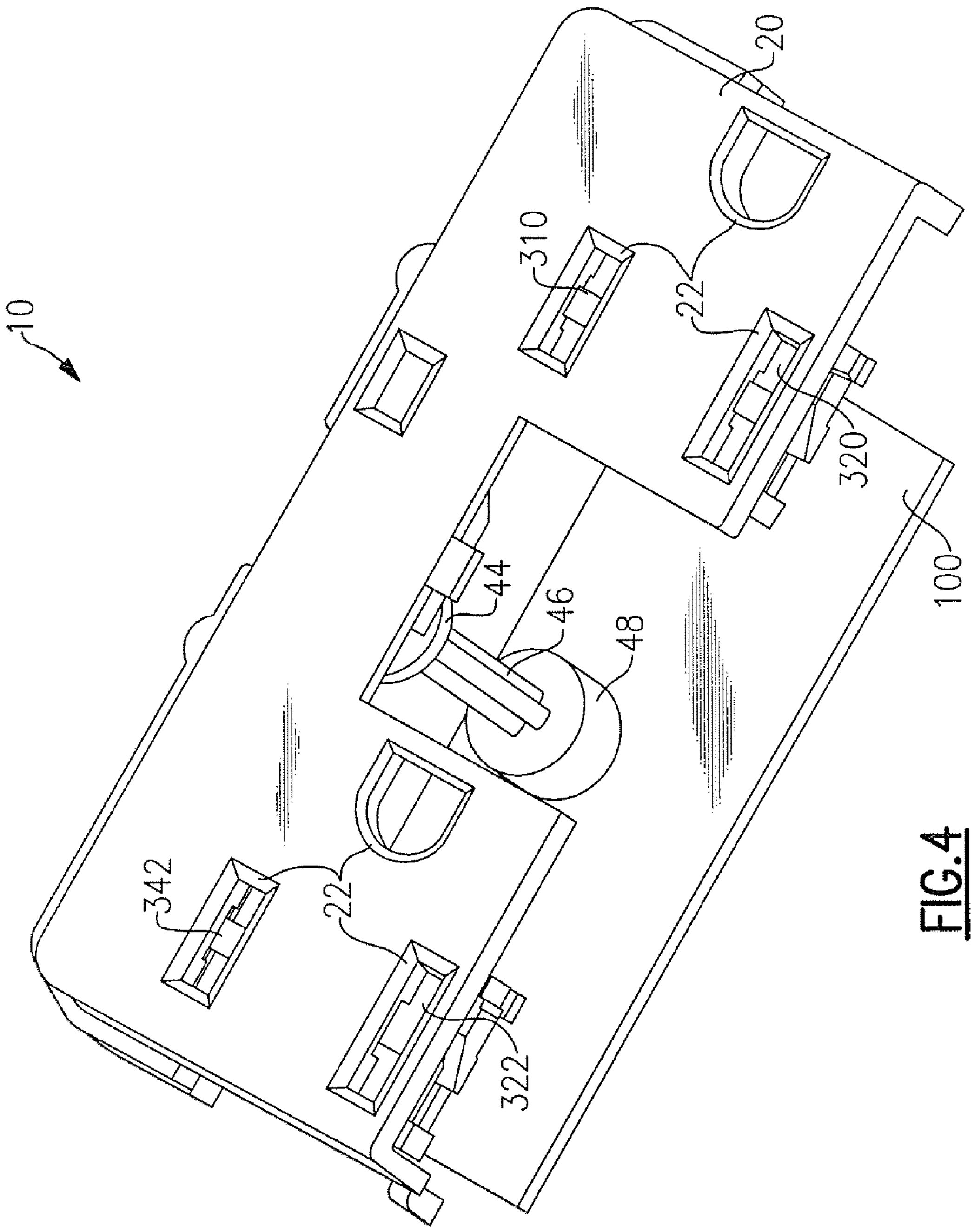
FIG. 4 is a front view of the receptacle body shown in FIG. 1.

Referring to FIG. 4, a front view of the receptacle body 20 is shown in the unlocked position. In this view, it is important to note that neutral shutter member 310 and hot shutter member 320 block receptacle openings 22, preventing plug blades from making contact with the corresponding receptacle contact disposed within receptacle body 20.

Figure 5:
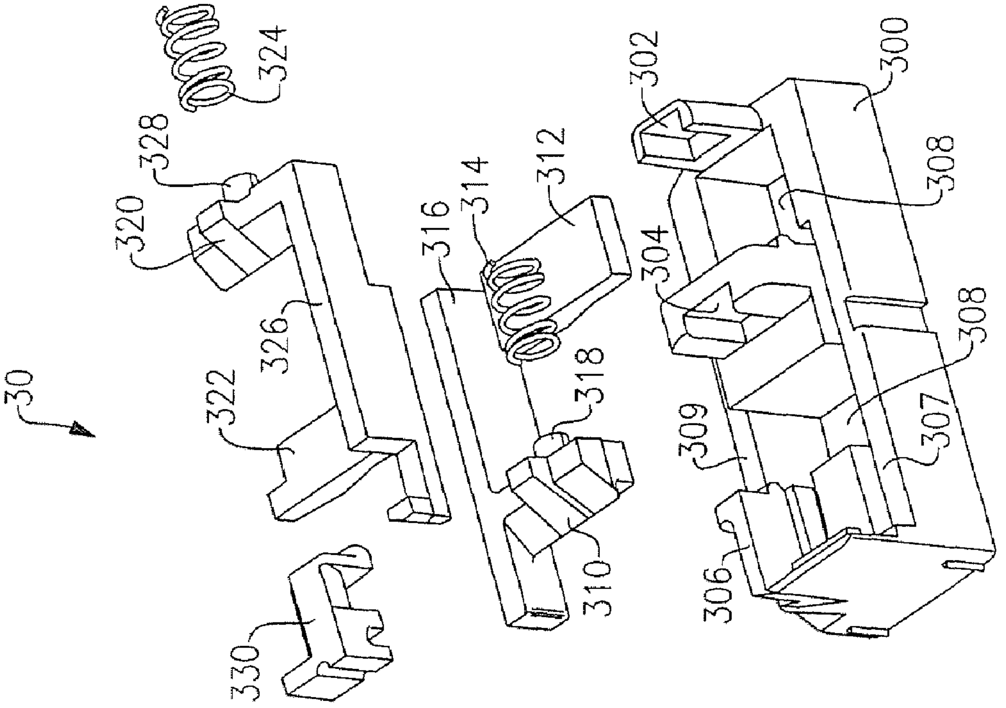
FIG. 5 is an exploded view of the protective shutter mechanism.

As embodied herein and depicted in FIG. 5, an exploded view of a protective shutter mechanism 30 in accordance with an embodiment of the present invention is disclosed. Shutter mechanism 30 includes a shutter housing 300 that is configured to accommodate neutral shutter member 310, hot shutter member 320, and in a 20A embodiment, T-slot shutter 330. Thus, mechanism 30 accommodates both 15 A service and 20 A service.

Shutter housing 300 includes pocket 302 and pocket 304 configured to accommodate spring 324 and spring 314, respectively. Shutter housing 300 also includes neutral shutter stop member 306. Shutter housing 300 also includes openings 308 which provide plug blades access to the electrical terminals coupled to the electrical circuit. Housing 300 includes slide surface 307 and slide surface 309 which accommodate slide arm 326 and slide arm 316, respectively.

It will be apparent to those of ordinary skill in the pertinent art that modifications and variations can be made to shutter housing 300 of the present invention depending on the material selected. For example, shutter housing 300 may be fabricated using any suitable material such as a molded plastic.

Shutter mechanism 30 includes neutral shutter member 310 which is configured to be inserted into housing 300. Neutral shutter 310 is configured to slide within housing 300 when plug blades are inserted into openings 22 (See FIG. 1 and FIG. 4). Neutral shutter 310 includes a blocking member 312 which prevents a single object from accessing the hot terminal contact via an opening 22. Of course, when plug blades are inserted, the neutral shutter 310 and the hot shutter 320 move simultaneously. Blocking member 312 to moves away from its respective opening 308. Neutral shutter 310 includes nipple member 318 which is configured to accommodate spring 314. As noted above, spring 314 fits into pocket 304. Thus, spring 314 is configured to urge neutral shutter 310 against stop member 306 to thereby close its respective opening 308. Finally, neutral shutter 310 includes slide arm 316 which is configured to slide along surface 309 of housing 300, when plug blades are inserted into openings 22.

Hot shutter member 320 interlocks with neutral shutter member 310. The combination of shutter 310 and shutter 320 are configured to be inserted into housing 300. Hot shutter 320 and neutral shutter 310 are configured to slide within housing 300 when plug blades are inserted into openings 22 (See FIG. 1 and FIG. 4). Hot shutter 320 includes a blocking member 322 which prevents a single object from accessing the neutral terminal contact via an opening 22. Of course, when a plug blades are inserted, the hot shutter 320 and the neutral shutter 310 move simultaneously, causing blocking member 322 to move away from its respective opening 308. Hot shutter 320 includes nipple member 328 which is configured to accommodate spring 324. As noted above, spring 324 fits into pocket 302. Thus, spring 324 is configured to urge hot shutter 320 against an opposing side of pocket member 304 to thereby close its respective opening 308. Finally, hot shutter 320 includes slide arm 326 which is configured to slide along surface 307 of housing 300, when plug blades are inserted into openings 22.

Figure 6:
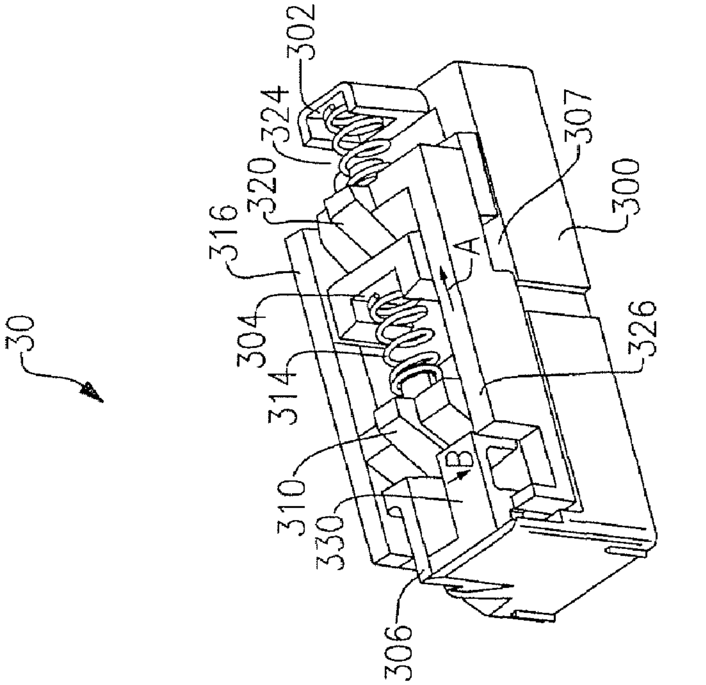
FIG. 6 is a view of the assembled protective shutter mechanism.

Referring to FIG. 6, a view of the assembled protective shutter mechanism is shown. FIG. 6 is self-explanatory, showing the interlocking relationship of shutter 310 and shutter 320. In operation, shutter member 310 and shutter member 320 move in direction A, as shown in FIG. 6. In the 15A embodiment, shutter 330 is not used because opening 22 does not include a T-slot. In this embodiment, shutter 330 is not moveable and may be integral with element 306. In the 20A embodiment, shutter 330 is configured to move in direction B once slide arm 326 moves in direction A.

The shutter blade assembly described in FIG. 5 and FIG. 6 may be employed in conjunction with the mis-wire detection apparatus described in FIGS. 1-3. Insertion of a connector plug to make electrical connection with the receptacle contacts is thereby prevented until such time as power has been properly connected to the line terminals of the protection device.

The shutter blades have been described with respect to a connector plug having two blades. The shutter blades prevent the risk of an electric shock when an object is inserted into one receptacle opening. Also, the shutter blades can be substantially hermetically sealed to prevent the entrance of contaminants.

In another embodiment of the present invention, shutter mechanism 30 is further configured to prevent the entrance of contaminants. Two receptacle openings are protected as previously described. A third receptacle opening may be included to receive a ground blade of a grounded connector plug. A second protective shutter mechanism is included that moves from the closed position for preventing ingress of contaminants, to the open position when the ground blade is inserted. The second protective shutter mechanism operates independently from the first shutter mechanism. This allows insertion of connector plugs that are not equipped with a ground blade, and the insertion of connector plugs whose ground blades are configured to be longer than the other blades. The second shutter mechanism is similar to shutter mechanism 30, with the exception that one of the slide assemblies is omitted.

In another embodiment of the present invention, the shutter blades can be configured to prevent the entrance of contaminants. Single slide assemblies are disposed in the receptacle housing to correspond with each receptacle opening. When an object, preferably the blade of a connector plug is inserted into a receptacle opening, the corresponding slide assembly urges the blade shutter to move from the closed to the open position. This allows the plug blade to insert further to make electrical connection with the corresponding receptacle contact. The single slide assemblies are configured to move independently from one another.

Figure 7:
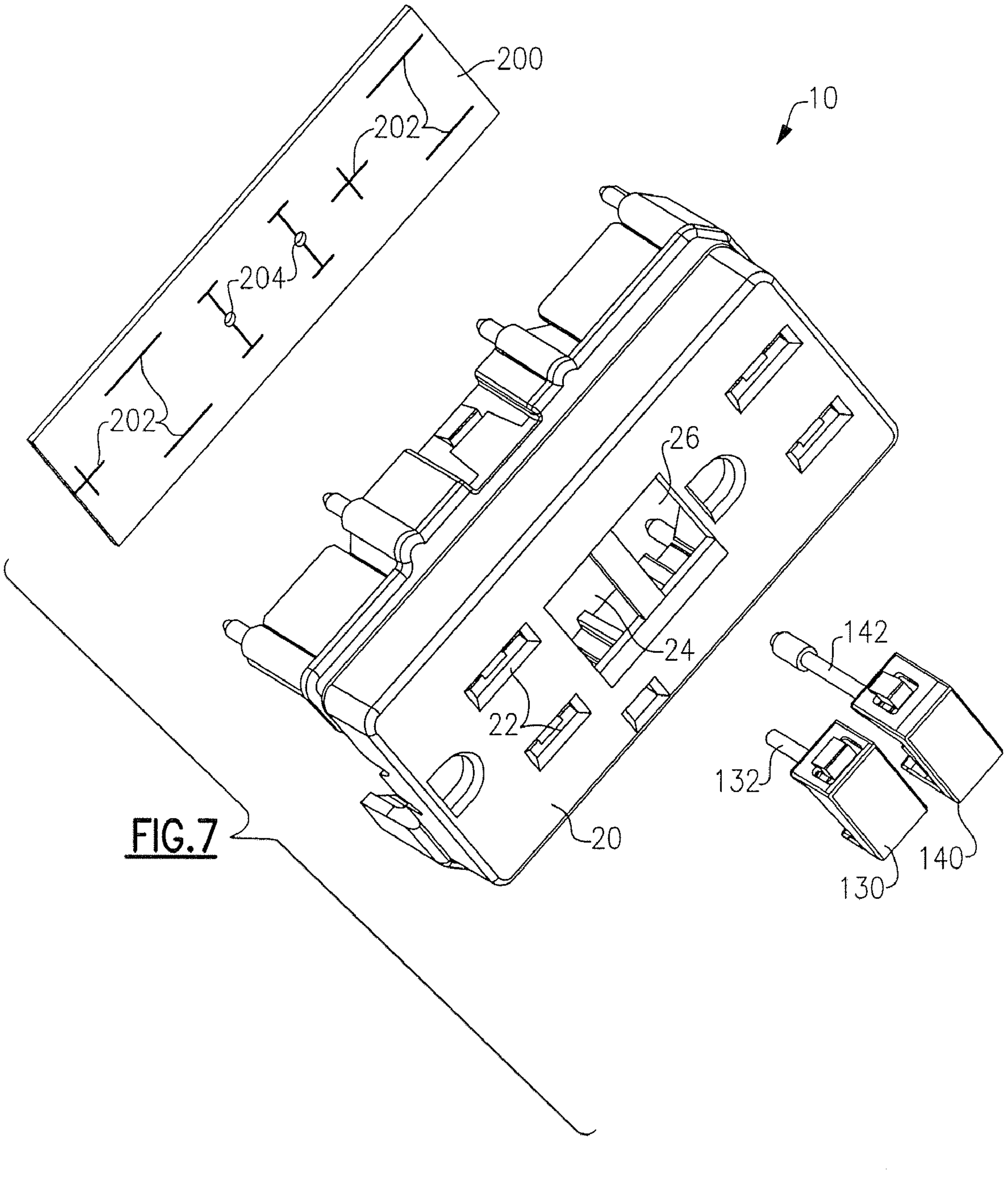
FIG. 7 is an exploded view showing the protective membrane.

As embodied herein and depicted in FIG. 7, the receptacle openings of the protective device are protected with a flexible membrane 200 to keep out contaminants. The flexible membrane 200 has sealable holes 202 corresponding to the receptacle openings 22. When sealable holes 202 are closed, body 20 is substantially sealed and contaminants are prevented from entering. When a plug blade or some other object is inserted into the receptacle opening 22, sealable hole 202 is configured to flex from a closed position into an open position, to thereby permit further insertion of the blade until an electrical connection with the corresponding electrical contact is made. Flexible membrane 200 may be configured to protect all receptacle openings, or may be configured to protect openings that are otherwise unprotected by the blade shutters, with or without mis-wire protection.

As will be described below, the present invention also provides a means for detecting a mis-wire condition. This mis-wire detection functionality may be employed in conjunction with protective shutter mechanism 30 to thereby prevent the insertion of a plug into the receptacle until such time as power has been properly connected to the line terminals of the protection device.

Figure 8:
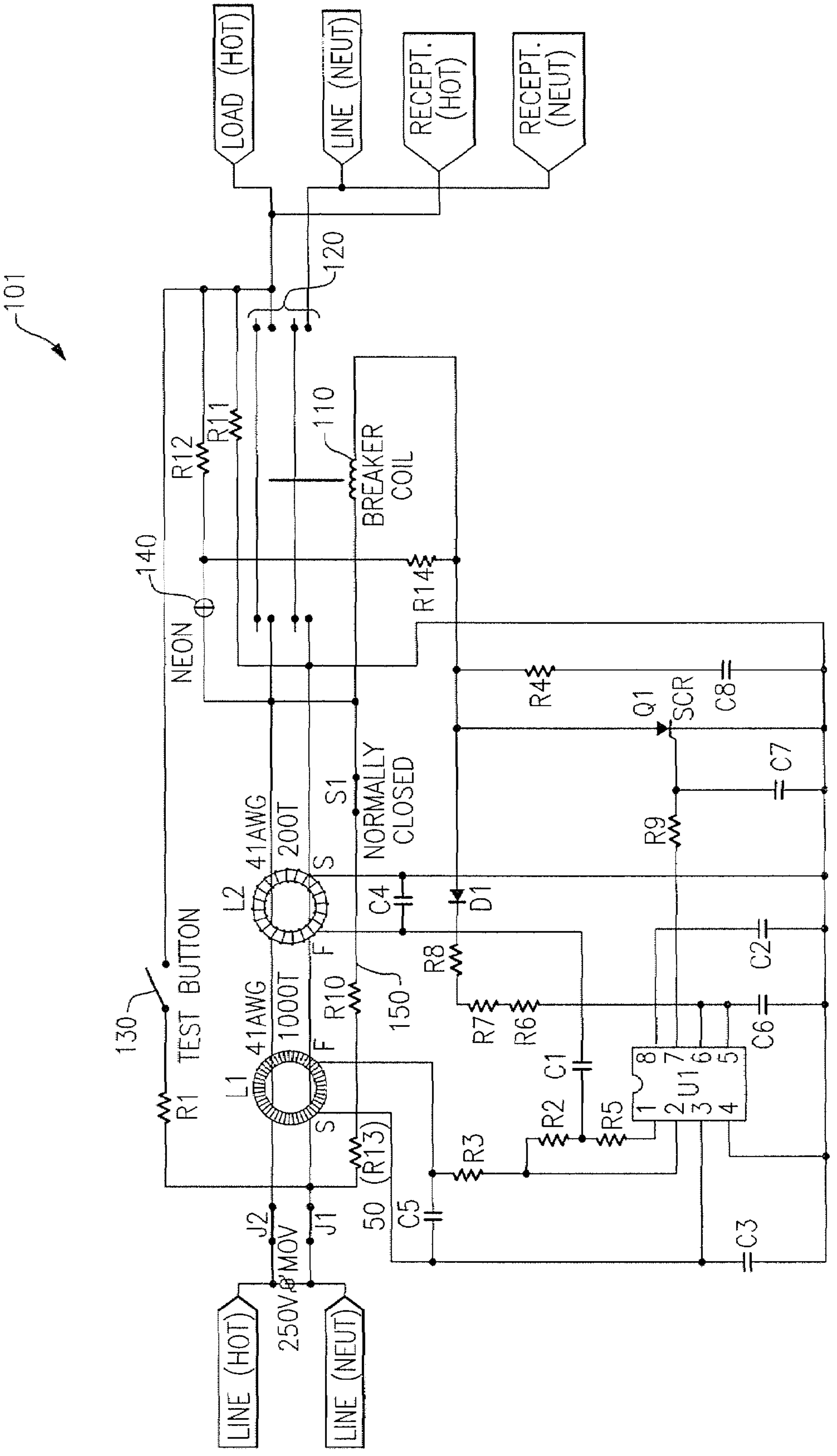
FIG. 8 is a schematic of the fault detection circuit in accordance with an embodiment of the present invention.

As embodied herein, and depicted in FIG. 8, a schematic of the fault detection circuit in accordance with an embodiment of the present invention is disclosed. Referring to FIG. 8, a GFCI circuit is shown generally at 101 which may be coupled to circuit board 100. When a differential transformer L1 senses unequal amounts of current flowing in the hot and neutral conductors due to a ground fault condition, circuit 101 causes a breaker coil 110 to activate, opening circuit interrupting mechanism 120. Circuit interrupting mechanism 120 conventionally includes hot and neutral bus bars that make and break contact with the hot and neutral power lines, respectively, via contacts located on both the bus bars and power lines at four contact points. A test button 130 induces a simulated ground fault when pushed in and causes breaker coil 110 to activate.

This improved GFCI contains two unique features that address the problems noted in the background section. The first is a mis-wire circuit 150 which uses resistor 50 (R13) as a fault resistance that creates a differential current on the primary of the differential current transformer L1. The differential current exceeds the level of differential current that the GFCI has been designed to interrupt, typically 6 milliamperes. Fault resistor R13 is on the line side of circuit interrupting mechanism 120 electrically located between the line and load terminals of the hot and neutral wire paths. The ground fault circuit sensing electronics of GFCI circuit 101 derives power from the line side terminals of the GFCI.

Should the GFCI be wired in a mode where power is supplied to the load terminals, i.e., mis-wired, and if the GFCI is tripped, that is, the contact points in the circuit interrupting mechanism 120 are open, nothing visible happens. If the GFCI is in the reset condition, that is, the contact points in the circuit interrupting mechanism are closed, it will immediately trip when powered. In this mode, the current flowing through the fault resistance R13, derived from the line terminal side of the device, is interrupted when the device trips. The estimated time it takes for the fault resistance R13 to burn away is greater than 50 ms. Because the trip time of the GFCI is less than or equal to 25 ms, fault resistance R13 does not have enough time to burn away. If one attempts to reset the device when in the mis-wired condition, the device immediately trips out again, and this continues until such time as the device is wired correctly, that is, when power is applied to the GFCI at the line terminals. This effectively results in a GFCI that will not operate, i.e., be able to be reset to provide power to the line terminals or open shutters 30 until such time as the device is properly wired. In light of the above description of FIGS. 1-7, it becomes apparent that resistor 50 has several functions.

When electrical power is connected in a correct manner to the line terminals, a differential current is created by the fault resistance R13 when power is applied to the device. If the device is reset before power is applied, the device trips as a result of this differential current. If the device is already in the tripped condition before power is applied, nothing visible happens. However, because the fault resistance is on the line side of the circuit interrupting mechanism 120, current through fault resistance R13 continues to flow, regardless of interrupting contacts 120 being open. This internal differential current, created by the fault resistance R13, heats fault resistance R13 until it burns away, typically in 50 ms. This can be accomplished by selecting a resistor or resistors whose power rating is greatly exceeded by the current, such that the resistor or resistors open. Once the device has been properly wired with power connected to the line terminals and fault resistance R13 has burned away, spring portion 480 is allowed to move within slot 102, unlocking shutters 30 and allowing the blades of a connector plug to make electrical connection to the receptacle contacts. When resistor R13 has burned away, there is no longer a fault current. The device can be reset and provide its normal protective functions to the receptacle contacts and to the feed-thru terminals.

Figure 9:
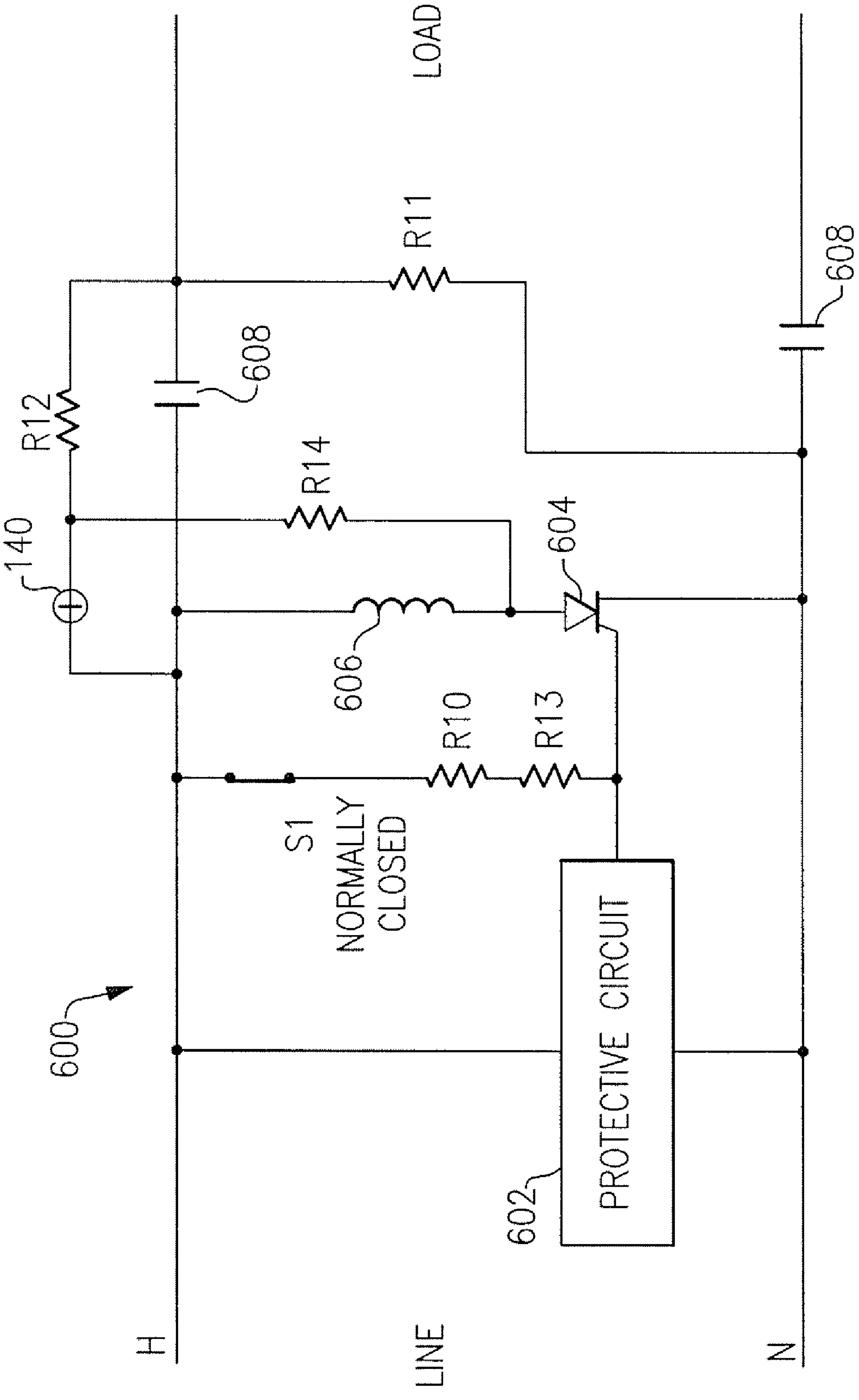
FIG. 9 is a schematic of the fault detection circuit in accordance with another embodiment of the present invention.

Referring to FIG. 9, an embodiment of the schematic is shown at 600. The embodiment is similar to the one shown in FIG. 8 except that it is generalized to apply to different protective devices such as ground fault circuit interrupters (GFCIs) or devices intended to interrupt ground faults from personnel contact with a power line conductor of the electrical distribution system, arc fault circuit interrupters (AFCIs) intended to interrupt line current which if allowed to continue could cause an electrical fire, combination devices that provide both AFCI and GFCI protection, or the like.

According to this embodiment, the protective devices mentioned have a protective circuit 600 that may be coupled to printed circuit board 100. Protective circuit 600 detects the respective fault condition, turning on an electronic switching device such as SCR 604, energizing a solenoid 606 coil which receives power from the line conductors, to open interrupting contacts 608. Fault resistance R13 has the same function as has been described above. When power is mis-wired to the load terminals and the protective device is reset such that interrupting contacts 608 are closed, current flows through fault resistance R13 and the gate-cathode junction of SCR 604, energizing solenoid 606 and tripping the interrupting contacts 608. Fault resistance R13 is chosen to withstand the current flow for the time that power is applied to the load terminals to the moment when interrupting contacts 608 open, approximately 25 milliseconds. If line power is connected as intended to the line terminals of the protective device, current flows through fault resistance R13 and the gate cathode junction of SCR 604 until such time as fault resistance R13 burns away, after which time it is possible to accomplish a resetting of the interrupting contacts 608. Solenoid 606 is designed not to burn out during the interval that SCR 604 is conductive, which interval is designed to be approximately 100 milliseconds. In this manner the protective functions described in FIG. 1 are provided without necessarily requiring the components typically associated with a GFCI, e.g., the differential current transformer L1 as shown in FIG. 8, or a fault resistor circuit connected to both the hot and neutral line conductors for producing a differential current. If an electronic switching device other than an SCR is used, e.g., a bipolar transistor, the connections shown here as being made to the gate of the SCR would instead be made to the base of the bipolar transistor. “Gate” and “base” are intended to have an equivalent meaning in this specification and claims.

To those skilled in the art there are number of ways of configuring mis-wire sensor 50 to respond to the proper wiring condition to unlock shutters 30. As has been described, fault resistance R13 is contiguous when the protective device is mis-wired but burns away when the protective device is properly wired. As an alternative, fault resistance R13 is contiguous when the protective device is mis-wired but heats sufficiently when properly wired to melt solder pads to which fault resistance R13 is connected whereupon the mechanical energy of spring 480 allows displacement of fault resistance R13. When this happens, spring 480 moves within slot 102 allowing shutters 30 to unlock, thereby allowing the blades of a connector plug to make electrical connection with the receptacle contacts.

Reference is made to U.S. Pat. No. 6,522,510, and U.S. patent application Ser. No. 09/827,007, which are incorporated herein by reference as though fully set forth in their entirety, for a more detailed explanation of the protective device of the present invention.

Referring to Figure back to FIG. 7, membrane 200 may be configured to protect openings that are otherwise unprotected by the blade shutters, such as opening 24 which accommodates test button 130, and opening 26 which accommodates reset button 140. Test button 130 induces a simulated ground fault when pushed in. A similar component for producing a simulated test signal can be included in other protective devices such as arc fault circuit interrupters. The test button 130 is user accessible and has been typically located on front cover 20. Aperture 24 in front cover 20 is larger than the size of button 130 to thereby permit motion of arm 132 that activates the simulated test signal. The simulated test signal causes the circuit breaker coil 110 to activate, causing the contact points in the circuit interrupting mechanism 120 to open.

Protective device 10 may be provided with a user accessible reset button 140 to reset the contact points after the device has been successfully tested. Reset is accomplished by reset button 140 which is coupled to arm 142. Reset button 140 is disposed within a second aperture 26 in front cover 20. Again, aperture 26 must be larger than the reset button 140 to permit the actuation of button 140. Without membrane 200, contaminants may potentially enter in the spaces around button 130 and button 140. Membrane 200 is configured to provide a seal around arms 132 and 142 to thereby prevent the deleterious ingress of contaminants into the protective device. The seal is configured so as not to interfere with the motions of arms 132 and 142. Membrane 200 can be coupled to arms 132 and 142 by indents 204. In one embodiment, membrane 200 may be configured as separate sealing components.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An electrical wiring device comprising:

a plurality of line terminals and a plurality of load terminals;

a fault protection circuit assembly coupled to the plurality of line terminals, the fault protection circuit assembly being configured to detect at least one fault condition and couple the plurality of line terminals from the plurality of load terminals in response to detecting at least one fault condition;

a receptacle member including a housing and a cover, the cover assembly including receptacle openings configured to accommodate plug contact blades;

receptacle contacts disposed in the housing and coupled to the line terminals to thereby establish an electrical connection between the receptacle contacts and the line terminals, each receptacle contact being in communication with a corresponding receptacle opening;

a protective shutter mechanism integrated into the housing, the protective shutter mechanism being movable from a closed position to an open position upon insertion of the plug contact blades, the protective shutter mechanism being substantially sealed in the closed position and not movable from the closed position to the open position upon insertion of an object into one receptacle opening, whereby the object is prevented from making contact with the corresponding receptacle contact; and a mis-wiring sensor coupled to the plurality of line terminals and/or the plurality of load terminals, the mis-wiring sensor being configured to prevent the protective shutter mechanism from moving from the closed position to the open position upon insertion of the plug contact blades if a proper wiring condition is not sensed.

2. The device of claim 1, wherein the mis-wiring sensor is configured to allow the protective shutter mechanism to move from the closed position to the open position upon insertion of the plug contact blades if the proper wiring condition is sensed.

3. The device of claim 1, wherein the protective shutter mechanism comprises:

a frame member disposed in the housing, the frame member including a first aperture aligned with one receptacle opening, and a second aperture aligned with another receptacle opening; and a slide assembly coupled to the frame member, the slide assembly including a first slide assembly and a second slide assembly, the first slide assembly and the second slide assembly being disposed spaced apart from each other in the closed position, and configured to simultaneously slide together when the protective shutter mechanism is moved from the closed position into the open position.

4. The device of claim 3, wherein the first slide assembly includes a first shutter blade configured to seal the first aperture in the closed position, and the second slide assembly includes a second shutter blade member configured to seal the second aperture in the closed position.

5. The device of claim 4, wherein the insertion of the plug contact blades simultaneously moves the first shutter blade member and the second shutter blade member toward one another such that each receptacle opening is in communication with a corresponding receptacle contact.

6. The device of claim 4, wherein the insertion of the object against either the first shutter blade member or the second shutter blade member, but not both, does not cause the first shutter blade member and the second shutter blade member to simultaneously slide.

7. The device of claim 4, further comprising a first spring element coupling the first shutter blade member to the frame member.

8. The device of claim 7, wherein the first spring element is in tension in the closed position.

9. The device of claim 7, wherein the first spring element is in compression in the open position.

10. The device of claim 4, wherein the first slide assembly includes a second blocking member coupled to the first shutter blade member and positioned to block the second aperture.

11. The device of claim 10, further comprising a spring element, the first shutter blade including a first pin configured to accommodate a first end of the spring element.

12. The device of claim 4, wherein the second slide assembly includes a first blocking member coupled to the second shutter blade member and positioned to block the first aperture.

13. The device of claim 12, further comprising a second spring element, the second shutter blade member including a second pin configured to accommodate the second spring element.

14. The device according to claim 3, further comprising a mis-wiring sensor disposed on a circuit board within the housing and coupled to the protective shutter mechanism, the mis-wiring sensor indicating whether the protective device is in a properly wired state or a mis-wired state, the protective shutter mechanism being in a locked position in either a non-wired state or the mis-wired state, the protective shutter mechanism being not movable from a closed position to an open position upon insertion of the plug contact blades in the locked position.

15. The device according to claim 14, further comprising:

a pivot arm removably coupled to the frame member in the locked position; and a cam member coupled to the pivot arm, the cam member being configured to rotate around an axis of rotation to thereby move the pivot arm in a linear direction to disengage the protective shutter mechanism from the pivot arm such that the protective shutter mechanism is moved to an unlocked position, whereby the protective shutter mechanism is movable from a closed position to an open position upon insertion of the plug contact blades.

16. The device according to claim 15, further comprising:

a rotor coupled to the cam member at a first end; and a torsion spring assembly coupled to the rotor at a second end and the miswiring sensor, the torsion spring assembly being configured to release stored mechanical energy when the mis-wiring sensor senses the proper wiring condition, such that the rotor causes the cam member to rotate about the axis of rotation to thereby unlock the protective shutter mechanism.

17. The device according to claim 3, wherein the protective shutter mechanism comprises a third slide assembly configured to correspond to a receptacle opening for a plug ground contact blade, the third slide assembly being movable from a closed position to an open position irrespective of the positions of the first slide assembly and second slide assembly, upon the insertion of the plug ground contact blade.

18. The device according to claim 1, further comprising:

a fault detection circuit disposed on a circuit board, the fault detection circuit being configured to detect the at least one fault condition and provide a fault detect signal in response thereto; and interrupting contacts coupled to the fault detection circuit and disposed between the line terminals and the at least one receptacle, the interrupting contacts being configured to disconnect the power source from the at least one receptacle in response to receiving the fault detect signal.

19. The device according to claim 18, wherein the at least one fault condition is a ground fault whose detection by the fault detection circuit causes the interrupting contacts to disconnect the power source from the at least one receptacle in response to receiving the fault detection signal.

20. The device according to claim 18 wherein the at least one fault condition is an arc fault whose detection by the fault detection circuit causes the interrupting contacts to disconnect the power source from the at least one receptacle in response to receiving the fault detection signal.

21. The device according to claim 1, further comprising a protective membrane integrated into the housing having at least one sealable hole portion, the protective membrane being substantially hermetically sealed when the sealable hole portion is in the closed position.

22. The device according to claim 21, wherein the receptacle openings include openings configured to accommodate a plug ground contact blade, the protective membrane being substantially hermetically sealed when the plug ground contact blade is not inserted.

23. The device according to claim 21, further comprising at least one manually operable button including an arm that passes through a sealable hole portion in the protective membrane, the sealable hole portion and the arm being substantially hermetically sealed.

24. A protection device including line terminals configured to be coupled to a power source disposed in an electric power distribution system when a proper wiring condition is effected, the protection device being configured to protect a portion of the power distribution system from at least one fault condition, the device comprising:

a receptacle member including a housing and a cover, the cover assembly including receptacle openings configured to accommodate plug contact blades;

receptacle contacts disposed in the housing and coupled to the line terminals to thereby establish an electrical connection between the receptacle contacts and the line terminals, each receptacle contact being in communication with a corresponding receptacle opening; and a protective shutter mechanism integrated into the housing, the protective shutter mechanism being movable from a closed position to an open position upon insertion of the plug contact blades when in an unlocked state, the protective shutter mechanism being substantially sealed in the closed position and not movable from the closed position to the open position upon insertion of an object into one receptacle opening, whereby the object is prevented from making contact with the corresponding receptacle contact; and a mis-wiring sensor coupled to the line terminals and the protective shutter mechanism, the mis-wiring sensor being configured to sense the proper wiring condition and actuate the protective shutter mechanism from a locked state to the unlocked state in response to detecting the proper wiring condition.

25. The device according to claim 24, further comprising feed-thru terminals configured to provide an electrical connection to a downstream receptacle, the at least one protective shutter being in the closed position when the power source is connected to the feed-thru terminals instead of the line terminals.

26. The device according to claim 24, further comprising:

a fault detector coupled to the line terminals, the fault detector being configured to detect the at least one fault condition; and interrupting contacts disposed between the line terminals and the at least one receptacle, the interrupting contacts being configured to disconnect the power source from the at least one receptacle upon detection of the at least one fault condition.

27. The device according to claim 26, wherein the at least one fault condition includes a ground fault condition.

28. The device according to claim 26, wherein the at least one fault condition includes an arc fault condition.

29. The device according to claim 26, further comprising feed-thru terminals configured to provide an electrical connection to a downstream receptacle, the interrupting contacts being disposed between the line terminals and the feed-thru terminals and configured to disconnect the source of power from the feed-thru terminals upon detection of the at least one fault condition.

30. The device according to claim 24, wherein the mis-wiring sensor includes at least one resistor.

31. The device according to claim 24, further comprising:

a fault detection circuit configured to detect the at least one fault condition and provide a fault detect signal in response thereto;

interrupting contacts coupled to the fault detection circuit and disposed between the line terminals and the at least one receptacle, the interrupting contacts being configured to disconnect the power source from the at least one receptacle in response to receiving the fault detect signal; and a mis-wire circuit coupled to the fault detection circuit, the mis-wire circuit including the mis-wiring sensor, the mis-wiring circuit causing the fault detection circuit to detect the at least one fault condition when an improper wiring condition is effected.

32. The device according to claim 31, wherein the mis-wiring sensor is configured to open the mis-wire circuit when the mis-wiring sensor senses the proper wiring condition.

33. The device according to claim 32, wherein the mis-wiring sensor includes at least one resistor.

34. The device according to claim 33, wherein the proper wiring condition causes an amount of current to flow in the at least one resistor for at least a predetermined duration, such that the mis-wire circuit is opened and the protective shutter mechanism is moved from the locked position to the unlocked position.

35. The device according to claim 34, wherein the proper wiring condition causes a current to flow for at least a predetermined duration, such that the resistor heats to a temperature greater than the melting point of solder, such that the mis-wire circuit is opened and the protective shutter is moved from the locked position to the unlocked position.

36. The device according to claim 31, wherein the fault detection circuit includes a GFCI detection circuit.

37. The device according to claim 31, wherein the fault detection circuit includes an AFCI detection circuit.

38. The device according to claim 24, further comprising:

a fault detection circuit disposed on a circuit board, the fault detection circuit being configured to detect the at least one fault condition and provide a fault detect signal in response thereto, the mis-wiring sensor being disposed on the circuit board; and interrupting contacts coupled to the fault detection circuit and disposed between the line terminals and the at least one receptacle, the interrupting contacts being configured to disconnect the power source from the at least one receptacle in response to receiving the fault detect signal.

39. The device according to claim 38, further comprising:

at least one pivot arm removably coupled to the protective shutter mechanism in the locked position; and a cam member coupled to the at least one pivot arm, the cam member being configured to rotate around an axis of rotation to thereby move the at least one pivot arm in a linear direction to thereby move the protective shutter mechanism from the locked position to the unlocked position.

40. The device according to claim 39, further comprising at least one spring member coupled to the protective shutter mechanism, the at least one spring member being configured to decouple the protective shutter mechanism from the at least one pivot arm when the pivot arm moves in the linear direction.

41. The device according to claim 39, wherein the at least one pivot arm includes a first pivot arm coupled to the cam member and a second arm coupled to the cam member, the first pivot arm being removably coupled to a first protective shutter mechanism and the second pivot arm being removably coupled to a second protective shutter mechanism.

42. The device according to claim 39, further comprising:

a rotor coupled to the cam member at a first end, and coupled to the circuit board at a second end; and a torsion spring assembly coupled to the rotor and the mis-wiring sensor, the torsion spring assembly being configured to release stored mechanical energy when the mis-wiring sensor senses the proper wiring condition, such that the rotor causes the cam member to rotate about the axis of rotation to thereby move the at least one pivot arm in the linear direction.

43. The device according to claim 42, wherein the mis-wiring sensor includes at least one resistor coupled to a portion of the torsion spring assembly by a solder connection.

44. The device according to claim 43, wherein the proper wiring condition causes a current to flow in the at least one resistor for at least a predetermined duration, such that the resistor heats to a temperature greater than the melting point of solder, such that the solder connection is broken, causing the torsion spring assembly to release the stored mechanical energy.

* * * * *